United States Patent
Chen et al.

(10) Patent No.: US 8,582,283 B2
(45) Date of Patent: Nov. 12, 2013

(54) FIXING MECHANISM FOR FIXING A DISPLAY DEVICE

(75) Inventors: Yung-Fu Chen, New Taipei (TW); Bing-Ying Li, New Taipei (TW); Chun-Yi Lin, New Taipei (TW); Ching-Yu Chu, New Taipei (TW); Ku-Chou Wu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 168 days.

(21) Appl. No.: 13/185,511

(22) Filed: Jul. 19, 2011

(65) Prior Publication Data
US 2012/0037770 A1    Feb. 16, 2012

(30) Foreign Application Priority Data
Aug. 11, 2010  (TW) ............................... 99215375 U

(51) Int. Cl.
*G06F 1/16*    (2006.01)
(52) U.S. Cl.
USPC ............ 361/679.21; 361/679.57; 361/679.58; 361/726; 248/222.13
(58) Field of Classification Search
USPC ................... 248/222.14, 689, 205.1, 220.21, 248/220.22, 221.11, 222.13, 917, 918, 919, 248/922, 923, 229.11, 229.21, 231.31, 248/316.917; 361/679.01, 679.02, 679.21, 361/679.57, 679.58, 726; 403/321, 326, 403/330
See application file for complete search history.

(56) References Cited

U.S. PATENT DOCUMENTS

| | | | |
|---|---|---|---|
| 8,118,269 B2 * | 2/2012 | Ternus et al. | 248/121 |
| 8,152,122 B2 * | 4/2012 | Hsu et al. | 248/231.91 |
| 2010/0141864 A1 * | 6/2010 | Lai | 349/58 |

* cited by examiner

*Primary Examiner* — Todd M. Epps
(74) *Attorney, Agent, or Firm* — Winston Hsu; Scott Margo

(57) ABSTRACT

A fixing mechanism for fixing a display device includes a display casing whereon a hole is formed, a shielding wall connected to a side of the display casing, and a bracket wedged inside the shielding wall in a detachable manner and installed on the side of the display casing. An opening is formed on the bracket. The fixing mechanism further includes a screwing component. An end of the screwing component passes through the hole on the display casing and is screwed inside the opening on the bracket. The other end of the screwing component is installed inside a wall mount. The shielding wall is for shielding the end of the screwing component.

16 Claims, 5 Drawing Sheets

FIXING MECHANISM FOR FIXING A DISPLAY DEVICE

BACKGROUND OF THE INVENTION

1. Field of the Invention

The present invention relates to a fixing mechanism for fixing a display device, and more particularly, to a fixing mechanism for fixing a display device with a simply structure and without utilizing rivets.

2. Description of the Prior Art

In an advanced technology, cathode ray tube (CRT) displays are replaced completely and flat-panel displays (FPD) are main products in a display market. In contrast to huge volume of the conventional cathode ray tube displays, the flat-panel displays have advantages of low power consumption, low radiation, and miniaturized volume. At this time, expansion of dimensions of the flat-panel displays popularizes the miniaturized flat-panel displays in the display market, such as in a domestic display, in an outdoor advertisement, and in an exhibition. A wall-mounted structure is applied for supporting the display on a wall. While setting the wall-mounted structure, the wall-mounted structure and the display need to be combined closely so that the display can be positioned on the wall stably. However, the conventional wall-mounted structure for LCD TV or LCD utilizes rivets by a steel plate or an iron plate as main fixing structure, and it has disadvantages of high cost, complicated manufacturing process, and difficult assembly so as to affect production efficiency.

SUMMARY OF THE INVENTION

The present invention provides a fixing mechanism for fixing a display device with a simply structure and without utilizing rivets for solving above drawbacks.

According to the claimed invention, a fixing mechanism for fixing a display device includes a display casing whereon a hole is formed, a shielding wall connected to a side of the display casing, and a bracket wedged inside the shielding wall in a detachable manner and installed on the side of the display casing. An opening is formed on the bracket. The fixing mechanism further includes a screwing component. An end of the screwing component passes through the hole on the display casing and is screwed inside the opening on the bracket, the other end of the screwing component is installed inside a wall mount, and the shielding wall is for shielding the end of the screwing component.

According to the claimed invention, at least one slot is formed on a side of the shielding wall, and the bracket comprises at least one bending portion installed inside the slot.

According to the claimed invention, at least one protrusion is formed on the display casing for contacting against the bracket when the bracket is wedged inside the shielding wall so as to constrain the bracket.

According to the claimed invention, a cavity is further formed on the bracket and the protrusion is engaged inside the cavity when the bracket is wedged inside the shielding wall.

According to the claimed invention, the bracket includes a stopping portion for stopping the protrusion when the bracket is wedged inside the shielding wall, and a forcing portion bent on a side of the stopping portion.

According to the claimed invention, the stopping portion is a wing structure.

According to the claimed invention, the shielding wall comprises at least one rib structure.

According to the claimed invention, the display casing and the shielding wall are connected monolithically.

According to the claimed invention, the screwing component is a screw and the opening of the bracket is a tapped hole.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
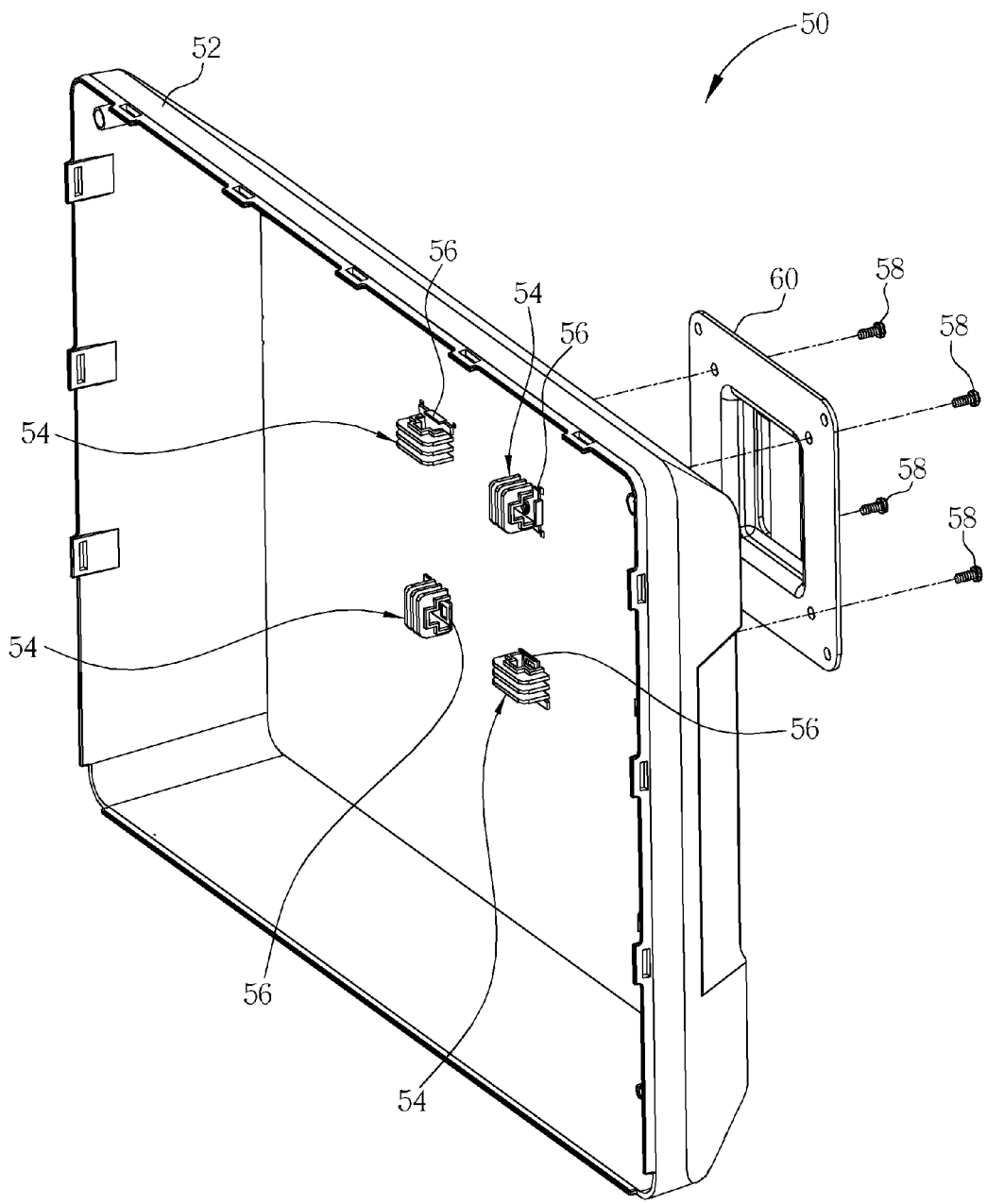
FIG. 1 and FIG. 2 are exploded drawings of a fixing mechanism at different viewing angles according to a preferred embodiment of the present invention.
Figure 2:
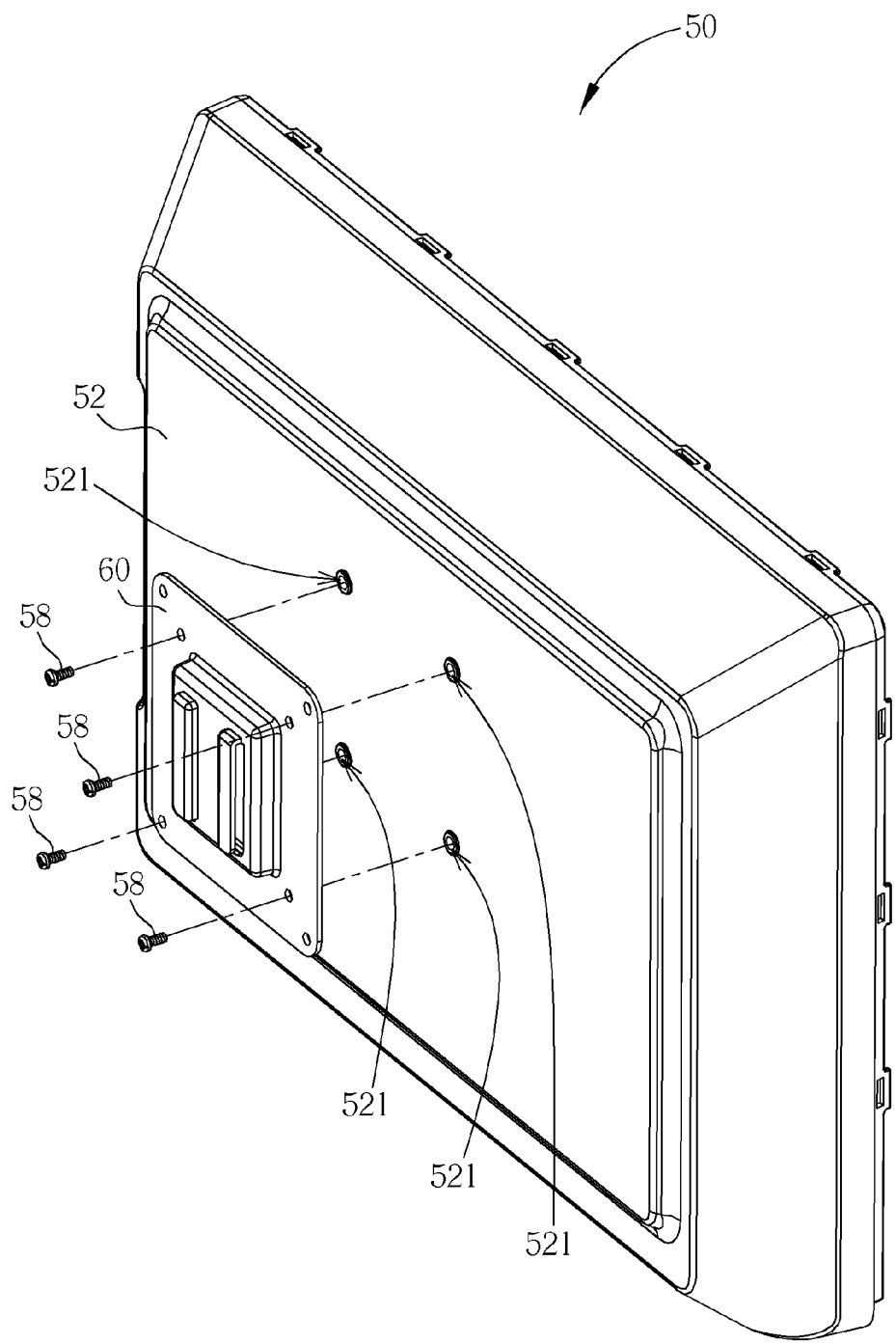
Figure 3:
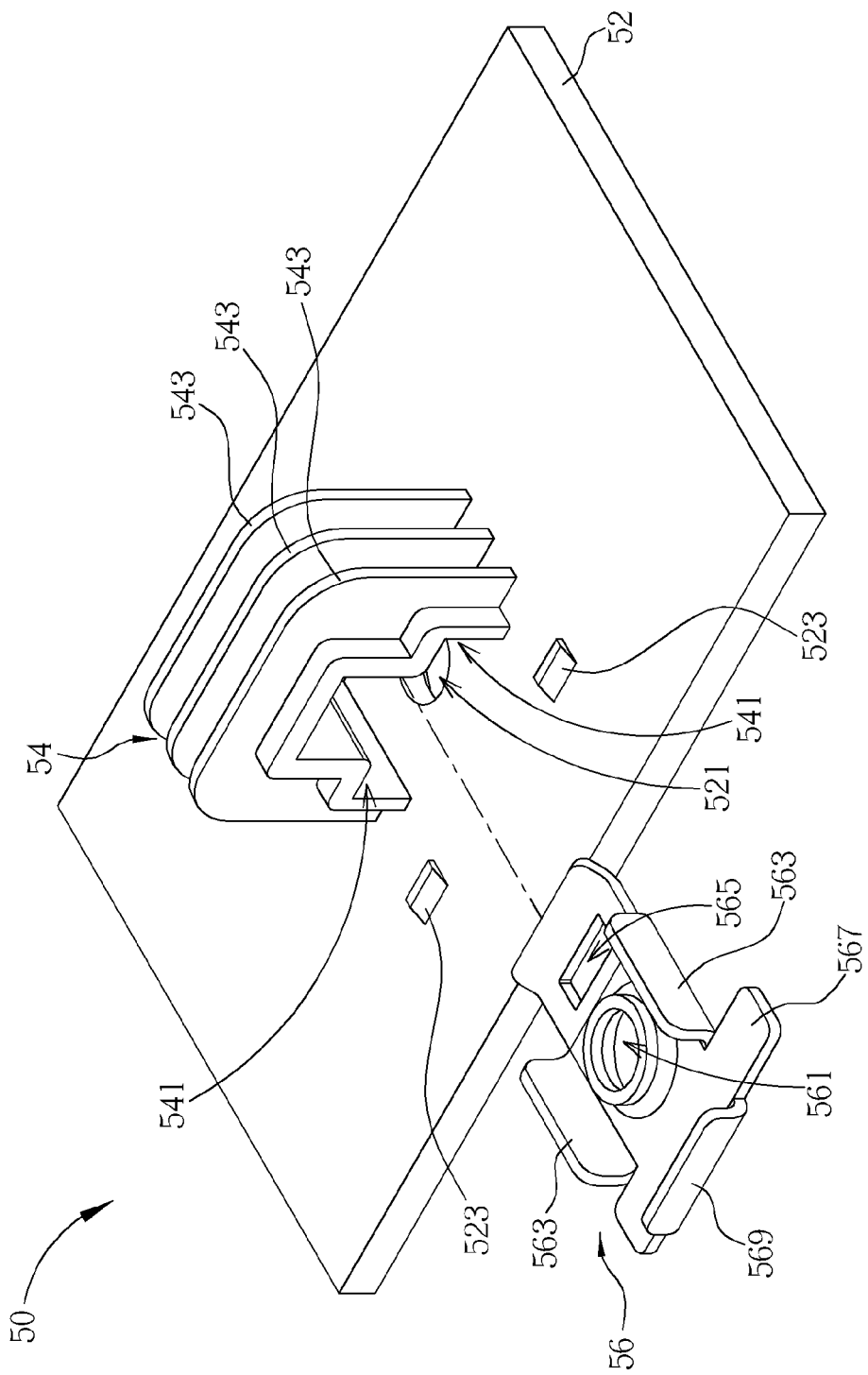
FIG. 3 and FIG. 4 are respectively an enlarged exploded drawing and an enlarged assembly drawing of the fixing mechanism according to the preferred embodiment of the present invention.
Figure 4:
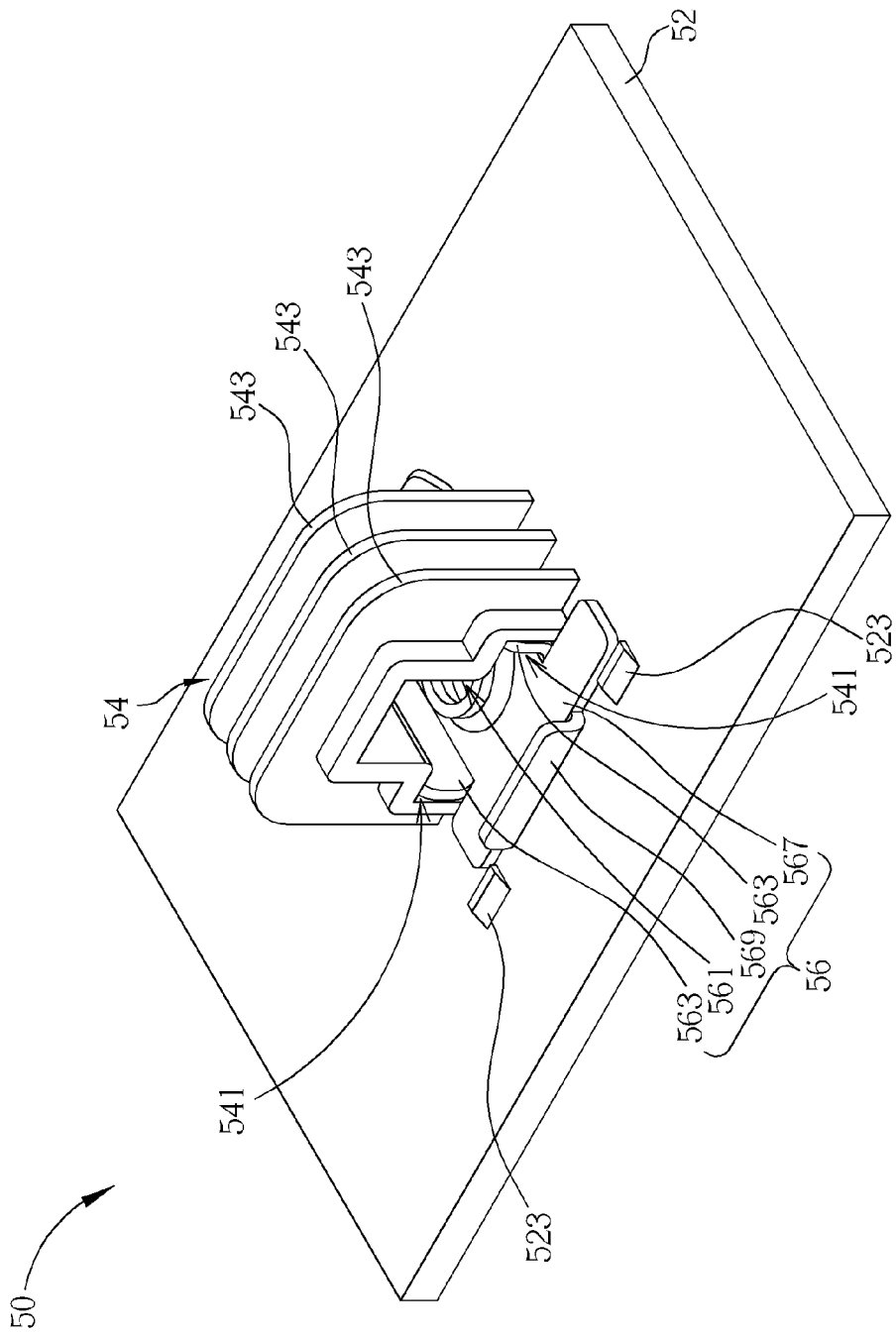

Please refer to FIG. 1 and FIG. 2. FIG. 1 and FIG. 2 are exploded drawings of a fixing mechanism 50 at different viewing angles according to a preferred embodiment of the present invention. The fixing mechanism 50 can fix a display device, such as fixing an LCD on a wall. The fixing mechanism 50 includes a display casing 52 whereon a hole 521 is formed. The display casing 52 can be made of plastic material. The fixing mechanism 50 further includes a shielding wall 54 connected to a side of the display casing 52. The display casing 52 and the shielding wall 54 can be connected monolithically, such as being integrated by injection molding. The fixing mechanism 50 further includes at least one bracket 56 wedged inside the shielding wall 54 in a detachable manner and installed on the side of the display casing 52. Please refer to FIG. 3 and FIG. 4. FIG. 3 and FIG. 4 are respectively an enlarged exploded drawing and an enlarged assembly drawing of the fixing mechanism 50 according to the preferred embodiment of the present invention. An opening 561 is formed on the bracket 56, and the opening 561 aligns with the hole 521 on the display casing 52 when the bracket 56 is wedged inside the shielding wall 54. The fixing mechanism 50 further includes a screwing component 58. An end of the screwing component 58 passes through the hole 521 on the display casing 52 and is screwed inside the opening 561 on the bracket 56, and the other end of the screwing component 58 is installed inside a wall mount 60. The wall mount 60 can be fixed on a supporting surface, such as a wall, so that the fixing mechanism 50 can fix the display device on the wall via the wall mount 60. The screwing component 58 can be a screw, and the opening 561 of the bracket 56 can be a tapped hole accordingly, so that the screwing component 58 and the opening 561 of the bracket 56 can be combined in a screwing manner. The disposal and amount of the set of the shielding wall 54, the bracket 56, and the screwing component 58 of the fixing mechanism 50 are not limited to the above-mentioned embodiment, and it depends on actual design demand.

Figure 5:
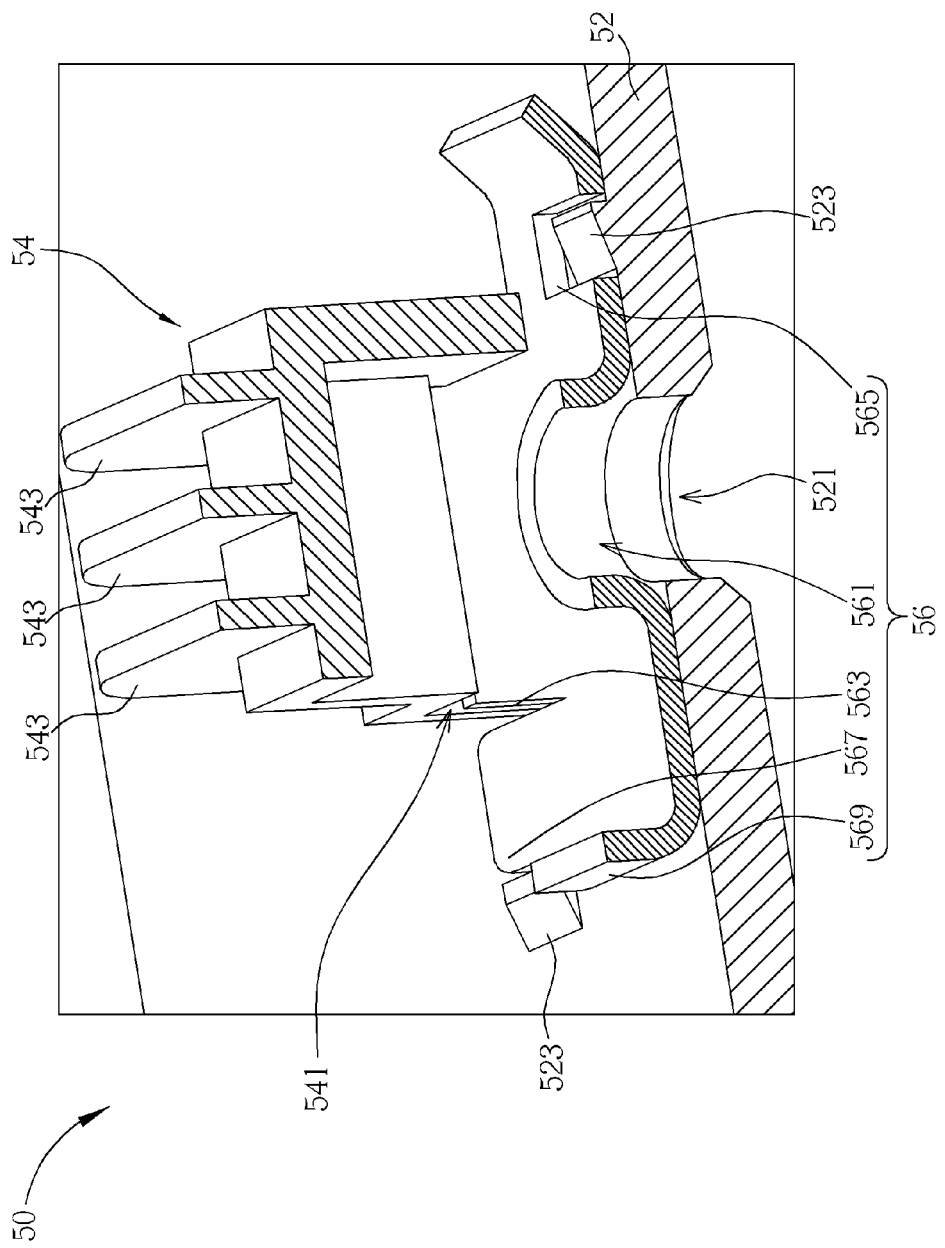
FIG. 5 is a cross-sectional view of the fixing mechanism according to the preferred embodiment of the present invention.

Two slots 541 are respectively formed on two sides of the shielding wall 54, and the bracket 56 includes two bending portion 563 respectively installed inside the slots 541 on the shielding wall 54 for wedging the bracket 56 inside the shielding wall 54 stably. The bending portion 563 can be formed by stamping. A lateral side and a bottom side of the bending portion 563 respectively contact with a lateral side and a bottom side of the slot 541 for increasing the contact area between the bracket 56 and the shielding wall 54. At least one protrusion 523 is formed on the display casing 52 for contacting against the bracket 56 when the bracket 56 is wedged inside the shielding wall 54, so as to constrain movement of the bracket 56. For example, please refer to FIG. 5, FIG. 5 is a cross-sectional view of the fixing mechanism 50 according to the preferred embodiment of the present invention. A cavity 565 is further formed on the bracket 56, and the front protrusion 523 is engaged inside the cavity 565 when the bracket 56 is wedged inside the shielding wall 54 so as to position the bracket 56. The bracket 56 can further include a stopping portion 567, which can be a wing structure, for stopping the lateral protrusions 523 when the bracket 56 is wedged inside the shielding wall 54 so as to position the bracket 56. The bracket 56 can further include a forcing portion 569 bent on a side of the stopping portion 567. A user can apply force on the forcing portion 569 so as to push the bracket 56 inside the shielding wall 54 or to pull the bracket 56 out of the shielding wall 54. Besides, the shielding wall 54 includes at least one rib structure 543 for enhancing structural strength of the shielding wall 54. The shielding wall 54 can be disposed selectively.

When the end of the screwing component 58 passes through the hole 521 on the display casing 52 and is screwed inside the opening 561 on the bracket 56, the shielding wall 54 can shield the opening 561 on the bracket 56 and the end of the screwing component 58 for protecting internal components, such as a circuit board, when screwing the screwing component 58 to the bracket 56. The shielding wall of the present invention replaces conventional steel rivets or iron rivets so as to reduce material and assembling cost and to increase production efficiency.

In contrast to the prior art, the fixing mechanism of the present invention utilizes the shielding wall to shield the screwing component without using conventional steel rivets or iron rivets. The present invention has advantages of low material and assembling cost and of easy manufacturing and assembling process so as to increase production efficiency effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fixing mechanism for fixing a display device comprising:
    a display casing whereon a hole is formed;
    a shielding wall connected to a side of the display casing, at least one slot being formed on a side of the shielding wall;
    a bracket wedged inside the shielding wall in a detachable manner and installed on the side of the display casing, an opening being formed on the bracket, and the bracket comprising at least one bending portion installed inside the at least one slot; and
    a screwing component, an end of the screwing component passing through the hole on the display casing and being screwed inside the opening on the bracket, the other end of the screwing component being installed inside a wall mount, and the shielding wall being for shielding the end of the screwing component.

2. The fixing mechanism of claim 1, wherein at least one protrusion is formed on the display casing for contacting against the bracket when the bracket is wedged inside the shielding wall so as to constrain the bracket.

3. The fixing mechanism of claim 2, wherein a cavity is further formed on the bracket and the protrusion is engaged inside the cavity when the bracket is wedged inside the shielding wall.

4. The fixing mechanism of claim 2, wherein the bracket comprises:
    a stopping portion for stopping the protrusion when the bracket is wedged inside the shielding wall; and
    a forcing portion bent on a side of the stopping portion.

5. The fixing mechanism of claim 4, wherein the stopping portion is a wing structure.

6. The fixing mechanism of claim 4, wherein the shielding wall comprises at least one rib structure.

7. The fixing mechanism of claim 1, wherein the display casing and the shielding wall are connected monolithically.

8. The fixing mechanism of claim 1, wherein the screwing component is a screw and the opening of the bracket is a tapped hole.

9. A fixing mechanism for fixing a display device comprising:
    a display casing whereon a hole is formed;
    a shielding wall connected to a side of the display casing;
    a bracket wedged inside the shielding wall in a detachable manner and installed on the side of the display casing, an opening being formed on the bracket, wherein at least one protrusion is formed on the display casing for contacting against the bracket when the bracket is wedged inside the shielding wall so as to constrain the bracket; and
    a screwing component, an end of the screwing component passing through the hole on the display casing and being screwed inside the opening on the bracket, the other end of the screwing component being installed inside a wall mount, and the shielding wall being for shielding the end of the screwing component.

10. The fixing mechanism of claim 9, wherein at least one slot is formed on a side of the shielding wall, and the bracket comprises at least one bending portion installed inside the slot.

11. The fixing mechanism of claim 9, wherein a cavity is further formed on the bracket and the protrusion is engaged inside the cavity when the bracket is wedged inside the shielding wall.

12. The fixing mechanism of claim 9, wherein the bracket comprises:
    a stopping portion for stopping the protrusion when the bracket is wedged inside the shielding wall; and
    a forcing portion bent on a side of the stopping portion.

13. The fixing mechanism of claim 12, wherein the stopping portion is a wing structure.

14. The fixing mechanism of claim 12, wherein the shielding wall comprises at least one rib structure.

15. The fixing mechanism of claim 9, wherein the display casing and the shielding wall are connected monolithically.

16. The fixing mechanism of claim 9, wherein the screwing component is a screw and the opening of the bracket is a tapped hole.

* * * * *